(12) United States Patent
Jadhav et al.

(10) Patent No.: US 7,685,141 B2
(45) Date of Patent: Mar. 23, 2010

(54) CONNECTION SUB-GRAPHS IN ENTITY RELATIONSHIP GRAPHS

(75) Inventors: Apurva Rameshchandra Jadhav, Shradhanandpeth (IN); Ashutosh Joshi, Bangalore, IN (US)

(73) Assignee: Yahoo! Inc., Sunnyvale, CA (US)

( * ) Notice: Subject to any disclaimer, the term of this patent is extended or adjusted under 35 U.S.C. 154(b) by 307 days.

(21) Appl. No.: 11/781,685

(22) Filed: Jul. 23, 2007

(65) Prior Publication Data
US 2009/0027392 A1    Jan. 29, 2009

(30) Foreign Application Priority Data
Jun. 6, 2007    (IN)    .................. 1217/DEL/2007

(51) Int. Cl.
*G06F 17/30* (2006.01)
(52) U.S. Cl. ..................................... 707/100
(58) Field of Classification Search ............ 707/1, 707/2, 102, 100
See application file for complete search history.

(56) References Cited

U.S. PATENT DOCUMENTS

2003/0187813 A1 * 10/2003 Goldman et al. ............... 707/1

* cited by examiner

*Primary Examiner*—Etienne P LeRoux
(74) *Attorney, Agent, or Firm*—Hickman Palermo Truong & Becker LLP (57) ABSTRACT

Techniques are described herein for a connection sub-graph generator that identifies important relationships between entities in entity relationship graphs. The generator first identifies two entities in an entity relationship graphs. A plurality of candidate path relationships between the two entities may be determined. For each such candidate path relationship, the generator determines a path type based on types of edge relationships that make up the candidate path relationship and generates a score value for the candidate path. This score value is based in part on the path type of the candidate path relationship. One or more candidate path relationships that have score values that indicate a high likelihood of interest to a user is selected to be included in a connection sub-graph.

18 Claims, 6 Drawing Sheets

Input:  S, set of end to end paths between s and t
b, maximum size of connection sub-graph
N, node prestige scores Output: Connection sub-graph H Algorithm:
a. initialize connection sub-graph H to be null
b. while size of H is less than budget b do
c.     for each remaining path p in S compute IC(p|H)
d.     pick the path p' having maximum IC(p'|H)
e.     add p' to H
f.     remove p' from S
g. end /*while*/
h. return sub-graph H

CONNECTION SUB-GRAPHS IN ENTITY RELATIONSHIP GRAPHS

CROSS REFERENCE TO RELATED APPLICATION

This application claims the benefit of priority to India Patent Application No. 1217/DEL/2007 filed on Jun. 6, 2007, entitled "CONNECTION SUB-GRAPHS IN ENTITY RELATIONSHIP GRAPHS" which is incorporated by reference in its entirety for all purposes as if originally set forth herein.

This application is related to U.S. patent application Ser. No. 11/729,203 filed on Mar. 27, 2007, entitled "USING ACTIVATION PATHS TO CLUSTER PROXIMITY QUERY RESULTS" which is incorporated by reference in its entirety for all purposes as if originally set forth herein.

FIELD OF THE INVENTION

This description relates to discovering important relationships between entities that form a large set of potential relationships and, in particular, to determining important relationships between entities in an entity relationship graph.

BACKGROUND

Entity relationship (ER) graph data is ubiquitous. Social networks such as Yahoo! 360 and Orkut are essentially ER graphs with entities (such as persons, communities, organizations, blogs, etc.) and relationships there between (e.g., such as having or sharing friend relationships, participating as members, working on projects, authoring articles, etc.). As another example, movie and entertainment data provided by the Internet Movie Database (IMDb) site can also be represented as an ER graph.

To identify meaningful information, some techniques provide that the ER may be simulated as an electric network. A hypothetical voltage, say one volt, may be placed between the two entities. The hypothetical voltage triggers a hypothetical electric current in the simulated electric network. Analytical or numerical calculations may be performed to determine a few particular paths between the two entities that carry the largest amounts of electric current between the two entities, as compared with the remaining electric current carried by other paths.

The problem with these techniques is that paths of an ER, as represented by a hypothetical electric network and as identified to be electrically significant, may not be truly important in reality. For example, a person may work with two other people on two entirely different documents. One of the two documents may be an extremely important document that requires extensive and intimate cooperation between the person and one of the two other people. On the other hand, the other document may be relatively unimportant that requires only relatively casual and informal cooperation between the person and the other of the two people. Since the person is linked with the two other people through one document (whether it is important or not), the electric network simulation would identify both relationships as extremely significant, but which significances in reality are quite different in degree.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for identifying important relationships between entities in entity relationship graphs is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An ER graph may have typed edges (or typed edge relationships). Traditional techniques tend to ignore edge types. Hence when computing a set of important path relationships that are made up by multiple edge relationships, the traditional techniques end up returning paths of same type. However, a user may be more interested in seeing a variety of (or diversity in) path relationship types. For example, consider a social network where two persons p1 and p2 share a number of emails. As a result, a number of paths connect these two persons. Each of these paths is of type p1—sends->email_i-receives->p2 or p2-sends->email_j-receives->p2. Traditional techniques such as electric network based techniques will pick up mainly these "email" paths as important because these paths are short and will allow large amounts of current flow. Other path relationships between p1 and p2 such as p1 and p2 working in same organization or co-authoring a document offer more resistance to current flow. Hence, these other relationships are ranked lower in importance in these traditional techniques. But these paths may be also important for a user. Hence, in accordance with some embodiments of this description, techniques are provided to ensure that there is a high degree of diversity in types of path relations.

The problem of locating important relationships between two or more particular entities represented in an entity relationship graph that contains a large set of entities can be conceptualized as finding a connection sub-graph that contains another set of entities that is much smaller than the large set of entities in the entity relationship graph. Additionally and/or optionally, an upper limit may be used to limit the number of entities in the connection sub-graph.

For example, two entities in an entity relationship graph may be related in many different direct or indirect ways. A connection sub-graph that only includes important relationships is a useful construct to discover and explore a potentially infinite number of paths, or relationships between the two entities.

Since relationships between three or more entities can be conceptually regarded as an aggregate of relationships between all possible pairs of the three or more entities, the problem of locating important relationships between three or more particular entities can be reduced to locating important relationships between two entities.

Based on the foregoing, the problem of locating important relationships in an entity relationship graph may be restated as finding a "good" connection sub-graph that: 1) at least contains two particular entities and zero or more other entities; 2) includes important relationships between the two particular entities; 3) the important relationships comprise edge (or neighbor) relationships among the particular entities and the other entities, as represented in the entity relationship graph; and 4) the number of the other entities may be optionally limited (for example, by a user query parameter, as will be further explained later).

For the purpose of this description, the entity relationship graph may be of any type and of any configuration. Likewise, an entity in the graph may be of any type, which may be, but is not limited to, a person, organization, community, blog, etc. Similarly, an edge relationship may be of any type, which may be, but is not limited to, a "workFor", "authoredBy", "associatedWith", etc.

In an embodiment, the connection sub-graph generator evaluates relationships between the two entities to yield the connection sub-graph. For the purpose of this description, the connection sub-graph generator may employ (numerical) measures in including or excluding relationships relative to the connection sub-graph. For example, one numerical measure may measure how rare a relationship is. More specifically, if the relationship is rare, a high score may be assigned to the relationship. Where a rare relationship is more favored than a non-rare (or commonly occurring) relationship, the resultant connection sub-graph will contain a more diverse set of relationships than otherwise.

Additionally and/or optionally, the connection sub-graph generator may employ a measure that measures how strongly the two entities are connected relative to a specific relationship. For example, a relationship between the two entities that has fewer hops may be favored than another relationship between the same two entities that has more hops. As a result, relationships representing strong connections are more favored to be included in the sub-graph than otherwise. For the purpose of this invention, other indications of how strongly the two entities are connected relative to a relationship may also be incorporated into this measure to evaluate the importance of the relationship.

Additionally and/or optionally, the connection sub-graph generator may employ a measure that indicates prestige of entities that are to be included in the connection sub-graph. This is so that an intermediate entity, involved in a relationship between the two particular entities, with a higher prestige may be favored than another intermediate entity, also involved in a relationship between the same two entities but, with a lower prestige. For the purpose of this invention, other indications of importance of entities and edge relationships may also be incorporated into this measure.

Thus, techniques under this description can find a connection sub-graph formed by important relationships, between the two particular entities, that carry indicia of higher type diversity, stronger connection, and higher degrees of prestige (associated with intermediate entities involved in the relationships) than those that are excluded from the connection sub-graph. As a result, even if there are a large number of possible entities and relationships, important relationships may be effectively discovered, resulting in a productive, meaningful relationship search experience.

The user input and results as described herein may pertain to the World Wide Web. However, this invention is not so limited. More generally, the input and output data associated with this approach may pertain to any data in any format, as long as it may be represented by an entity relationship graph that contains various types of entities and various types of edge relationships between entities.

Example System

Figure 1:
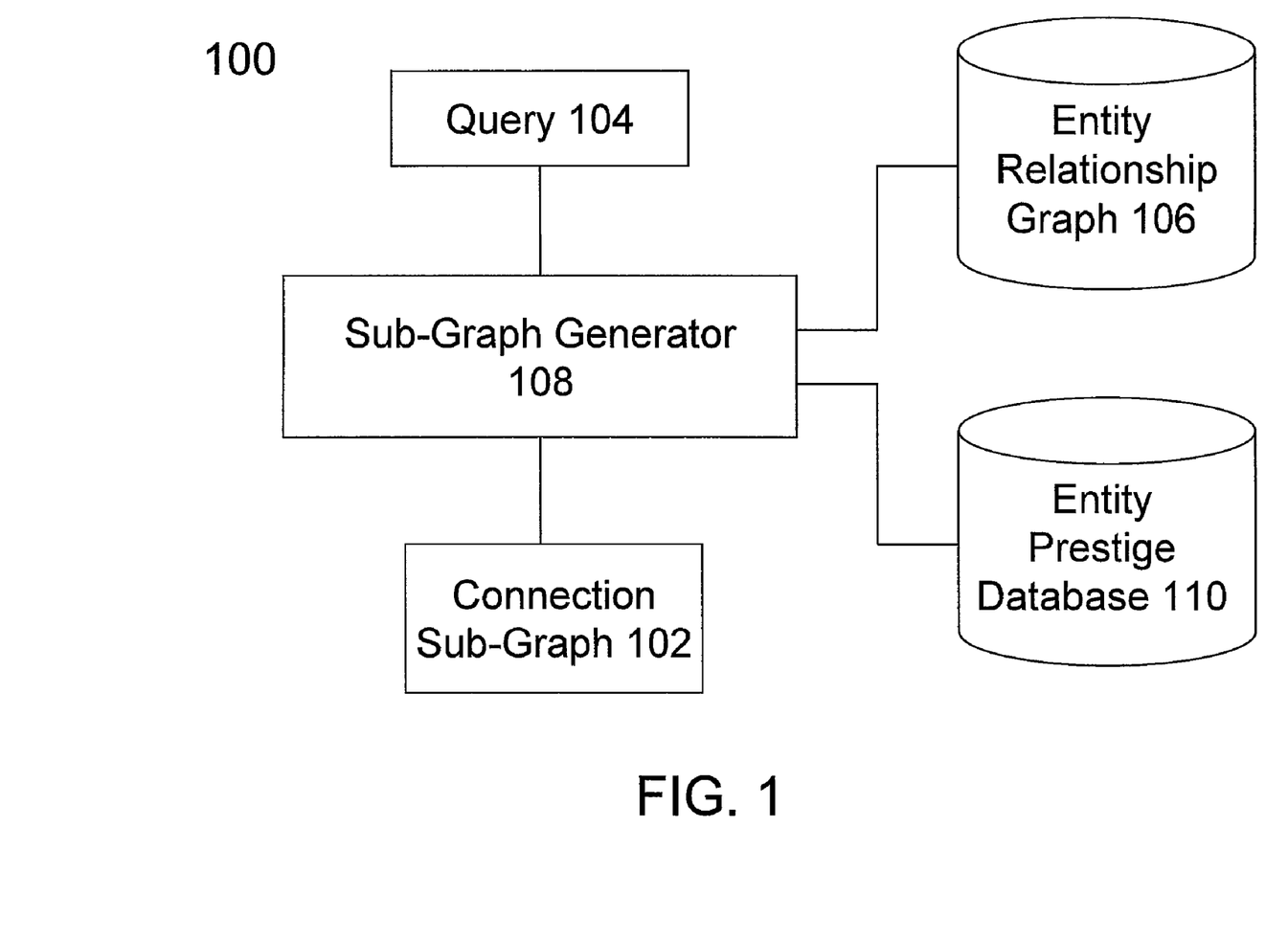
FIG. 1 is a block diagram that illustrates a sample system for identifying important relationships between entities in entity relationship graphs, according to an embodiment of the invention.

FIG. 1 illustrates an example system 100 for identifying important relationships between entities in entity relationship graphs in accordance with an embodiment of this description. In one embodiment, the important relationships identified form a connection sub-graph 102. In various embodiments, system 100 may or may not be part of a search engine. System 100 may receive a query 104, for example, from a user. The query 104 may specify a request for identifying important relationships in an entity relationship graph 106.

Besides the request for identifying important relationships, query 104 may comprise parameters in addition to, or as a part of, the request. For example, query 104 may comprise parameters identifying interested entities (e.g., two entities) for which the important relationships are to be identified. Additionally or alternatively, query 104 may comprise a parameter specifying an upper bound for a number of entities that can be maximally involved in the resultant important relationships. Additionally or alternatively, query 104 may comprise a parameter specifying an upper bound for a maximum number of the important relationships that are to be produced in response to query 104.

The entity relationship graph 106 from which the important relationships are to be identified (or extracted) may be one of a plurality of entity relationship graphs that are accessible to system 100 and/or that may be selected for identifying important relationships. In an embodiment, the entity relationship graphs may be stored in one or more databases that are accessible to system 100. Query 104 may be processed by a sub-graph generator 108 in system 100. The important relationships in entity relationship graph 106 between the entities specified may be aggregated by sub-graph generator 108 as connection sub-graph 102. The sub-graph may be rendered for displaying, for example, to the user who made query 104 on a user interface device.

Entity-Relationship Graph

A connection sub-graph query, such as the one illustrated in FIG. 1 as query 104, works particularly well for finding information where the underlying data is stored in a semi-structured format, such as an entity-relationship graph.

Figure 2:
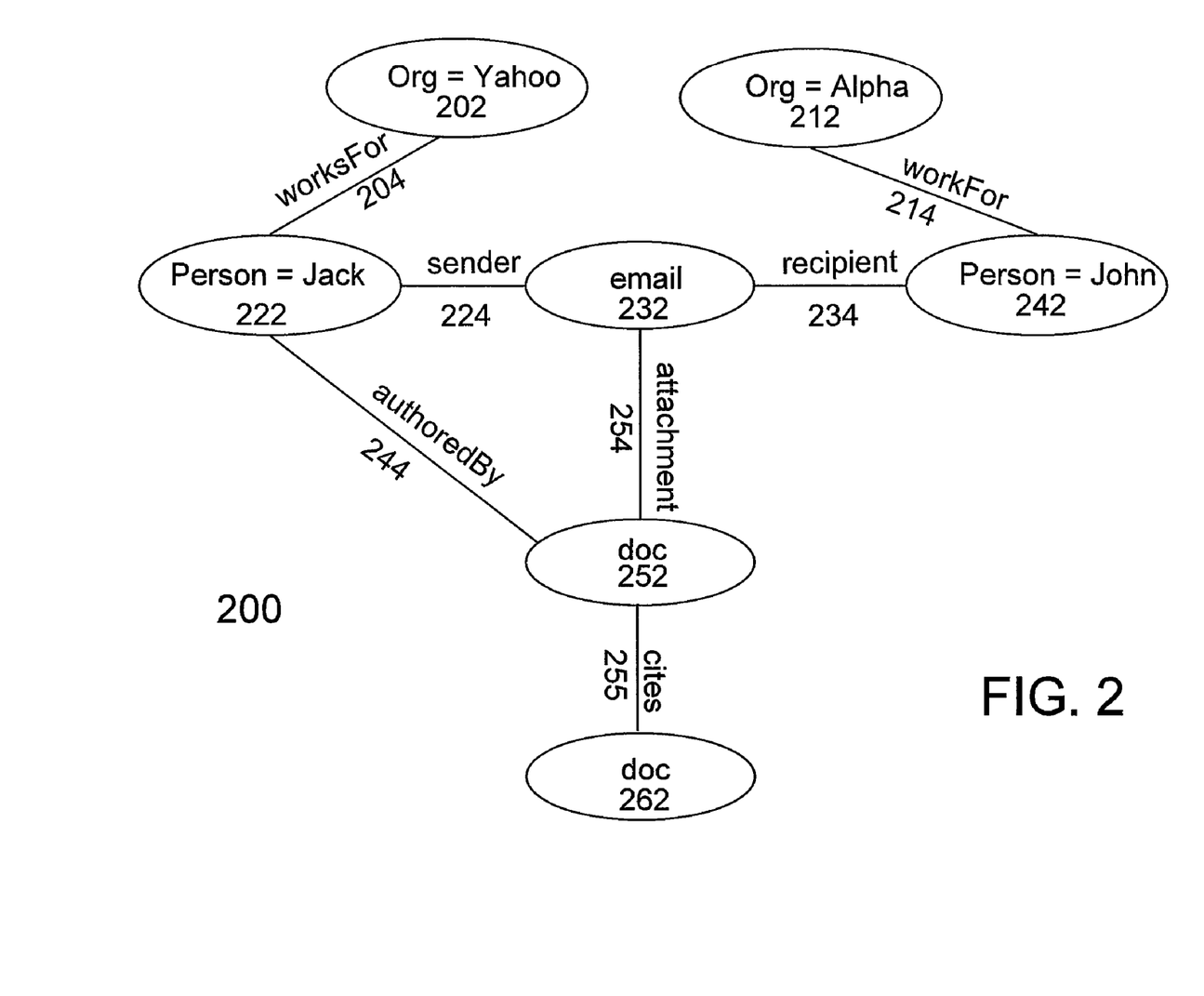
FIG. 2 illustrates an example entity relationship diagram, according to an embodiment of the invention.

FIG. 2 illustrates an example of an entity-relationship graph 200 in accordance with an embodiment of this description. Entity relationship graph 200, in one embodiment, is an undirected graph that includes a set of entities connected by a set of edge relationships. Each entity in the entity-relationship graph has a specific type, as well as, an associated text, or attribute, value. An edge relationship in the entity relationship graph connects two or more entities together, and each edge relationship may be of a specific type and weight. The weight of an edge relationship is a measure of the edge relationship's importance and can be assigned in a variety of ways as discussed herein.

In one embodiment, graph 200 may represent an instance of a stored social network, which includes entities such as person, organization, and document. Alternatively, graph 200 may represent something else. Graph 200 includes a set of entities (e.g., entities 202, 212, 222, 232, 242, 252, and 262) and a set of edge relationships (204, 214, 224, 234, 244, 254, 255, and 264). The entities in graph 200 are represented by vertexes and the edge relationships are represented by arcs. Examples of the edge relationships that can exist between entities are illustrated in FIG. 2 (e.g., "worksFor", "authoredBy", "sender", "recipient", etc.). Other entity relationship graphs may include a different set of entities and edge relationships.

Candidate Graph Generator

In various embodiments, system 100 illustrated in FIG. 1 may be implemented using one of various combinations of several tools and databases described herein. For example, one of these tools may be, but is not limited to, a candidate graph generator (302 of FIG. 3) that reduces the size of a large entity relationship graph (comprising, perhaps, millions of entities and edge relationships) to a relatively small entity relationship graph (comprising, perhaps, hundreds or thousands of entities and edge relationships), known as a candidate entity relationship graph. In one embodiment, instead of identifying important relationships directly from entity relationship graph 106, system 100 identifies important relationships from the candidate entity relationship graph that is generated by the candidate graph generator. Thus, except for this subsection (i.e., Candidate Graph Generator), as used in the rest of detailed description, the term "entity relationship graph" may sometimes mean a derived candidate entity relationship graph when and if such a candidate graph generator is used in system 100.

In one embodiment, the candidate graph generator initially creates an empty set of candidate entities. Then the candidate graph generator selects one of the entities specified in query 104 as a reference entity and includes the selected entity in the set of candidate entities. In addition, the candidate graph generator locates all neighbors of the reference entity and includes these neighbors of the reference entity in the set of candidate entities. At this point, the candidate graph generator may determine if the current set of candidate entities includes the other entity specified in query 104. If so, in one embodiment, the candidate graph generator may generate the candidate graph by including all the entities in the set of candidate entities as well as all edge relationships between these included entities.

However, if the set of candidate entities does not include the other entity specified in query 104, then the foregoing process may be repeated for all the newly added entities. That is, the candidate graph generator may iteratively select a reference entity from the newly added entities, locating its neighbors, including these neighbors in the set of candidate entities, and determining if the set of candidate entities includes the other entity specified in query 104.

In any event, this process of including neighbors of the set of candidate entities may stop when the set of candidate entities includes all the entities specified in query 104. Once such a set of candidate entities is obtained, the candidate graph may be identified as a graph including all entities of the set and interconnection (i.e., edge) relationships between all the entities.

For the purpose of illustration, the process of identifying (or generating) a candidate entity relationship graph is described as locating neighboring entities starting from one specified entity. It should be understood that this is for illustration purposes only. For the purpose of this description, other methods of identifying candidate entity relationship graphs can also be used. For example, instead of using one reference entity, the process may be iteratively repeated with each identified entity, in query 104 and, as a result, multiple sets of candidate entities each with a different identified entity may be identified. A candidate graph may be constructed by applying set-union operations on all the multiple sets of candidate entities to derive an overall candidate graph. Thus, these and all other variations of identifying candidate entity relationship graphs may be used for the purpose of this description.

Path Activation

As noted before, to measure how strongly connected two entities are, in one embodiment, the connection sub-graph generator may assign an initial activation score to one of the two entities, say entity s, and spread the initial activation score to other entities in the entity relationship graph in a recursive and/or iterative process.

Each entity in the graph may be of a certain degree. Such a degree, in one embodiment, is defined as the number of branches an entity projects out. For example, if an entity projects d branches out, then the entity's degree is said to be d.

In one embodiment, the initial activation score may be spread out starting from entity s then to s's neighbors, then to neighbors' neighbors. Since an entity may receive contributions of activation values from multiple neighbors, this process may be repeated iteratively or recursively. In order to prevent this process from being non-convergent, a damp factor may be used. Thus, even if an entity receives contributions from multiple source entities, the shortest, more direct spreading path from entity s is favored, and other spreading paths' contribution will be relatively small, depending on a choice of the damp factor.

In any event, using degrees of branches and the entity relationship graph, the initial activation score assigned to entity s may be spread through out the entity relationship graph. In one embodiment, this spreading process only iterates for a fixed number of times or until a steady state is reached. Therefore, this process will stop at some point. In one embodiment, before stopping, the process will determine if the other entity of the two entities has been reached by this spreading process. If not, this process continues until at least the other entity has been reached through a sufficient number of paths.

Path and Path Type

In one embodiment, a relationship between two entities may be represented by a path p that connects between the two entities. The path p can be formed by a sequence of entities and edge relationships such that there is an edge relationship from one entity to next entity. For example, p may be a path of n1-e1-n2-e2-n3-e3-n4, where n_i (i.e., n1 through n4 in the present example) are entities and e_i (i.e., e1 through e3 in the present example) are edge relationships. That is, path p represents a path relationship involving the two termination entities (i.e., n1 and n4) and two intermediate entities (i.e., n2 and n3) and comprising edge relationships (i.e., e1 through e3) between all these entities along the path p.

Given a path such as p, the type of p may be defined as the sequence of edge relationship types along the path p. In the present example of path p, the (path) type of path p may be defined as a tuplet of (type(e1), type(e2), type(e3)), in one embodiment. This path type may be deemed as the type of the relationship represented by p.

Information Content

As noted, the problem of finding important relationships between entities may be solved by finding a connection sub-graph 102 that is formed by the important relationships. In some embodiments, the problem of finding connection sub-graph 102 in turn may be formulated as follows:

Given an entity graph (with possibly weighted edge relationships) G and (query specifiable) entities s and t, find a connection sub-graph H that contains s and t and other entities. Additionally and optionally, a size constraint be may be given such that the number of the other entities shall not exceed b.

Thus, in these embodiments, the connection sub-graph generator 108 implements a solution to the above problem. In one embodiment, the connection sub-graph generator employs a greedy algorithm to maximize the information content associated with a connection sub-graph. Such information content may be defined as follows:

$$IC(H) = \alpha1 * \sum_{p \in paths(H)} Ac(p) + \alpha2 * \sum_{p \in Path\ Types(H)} EB(p) + \alpha3 * \sum_{n \in Nodes(H)} Prestige(n)$$

Where
$\alpha1$, $\alpha2$, and $\alpha3$:
1) are weight factors,
2) in one embodiment, each have values between 0 and 1, and
3) satisfy an identity of $\alpha1+\alpha2+\alpha3=1$.

Paths(H) is a set of paths between entities s and t in the connection sub-graph H.

PathTypes(H) is a set of path types in the connection sub-graph H.

Nodes(H) is a set of all entities in the connection sub-graph H.

AC(p) is a per-path measure (for path p; which may be normalized in one embodiment) that indicates how strongly the two entities s and t are connected, as will be further explained.

EB(p) is another per-path measure (for path p; which may be normalized in one embodiment) that indicates how rare path p is, as compared with other paths, as will be further explained.

Prestige(n) is a per-entity measure (for entity n; which may be normalized in one embodiment) that indicates a degree of importance for the entity n, as compared with other entities in the connection sub-graph.

Heuristic

Since the connection sub-graph H that contains important relationships is not initially known, a direct evaluation of the information content IC(H) may be avoided in some embodiments. Instead, a heuristic is used to extract paths between entities s and t. The extracted paths correspond to paths of high information content. For example, information content for a path p may be defined as $$IC(p) = \alpha1*Ac(p) + \alpha2*EB(PathType(p)) + \alpha3*\sum_{n \in Nodes(p)} Prestige(n)$$

Where Nodes(p) is a set of entities in the path p.

In one embodiment, according to the heuristic, the connection sub-graph H is initially empty. Thereafter, paths of high information content may be included in the connection sub-graph one at a time. Thus, during this process, the connection sub-graph will be populated by more and more paths. In one embodiment, the above IC (p) expression corresponds to information content of a path when the connection sub-graph is empty (i.e., only initially). As the connection sub-graph is populated with more and more paths, information content of paths to be later included is given by a modified expression as follows:

$$IC(p \mid H) = \alpha1 * Ac(p) + X(H, PathType(p)) * \alpha2 * EB(PathType(p)) + \alpha3 * \sum_{n \in Nodes(p) \backslash Nodes(H)} Prestige(n)$$

Where IC(p|H) stands for information content of a path p in view of the present connection sub-graph H (which may be evolving); Nodes(p)\Nodes(H) is a subset of entities in Nodes (p) that are not yet included in Nodes(H); X(H, PathType(p)) is one (i.e., 1) if the connection sub-graph H does not contain a path of PathType(p) and, otherwise, is zero (i.e., 0) if the connection sub-graph H does contain a path of PathType(p).

In one embodiment, the Ac (p) term in the above formulae may be further dampened for a type of path that is already included in the connection sub-graph H. In this embodiment, information content of a path p in view of the present connection sub-graph may be given by the following alternative formula:

$$IC(p \mid H) = (\alpha1)^{t+1} * Ac(p) + X(H, PathType(p)) * \alpha2 * EB(PathType(p)) + \alpha3 * \sum_{n \in Nodes(p) \backslash Nodes(H)} Prestige(n)$$

Where t is the number of paths of a same type PathType(p) already included in the connection sub-graph H.

Activation Spread Processor

Figure 3:
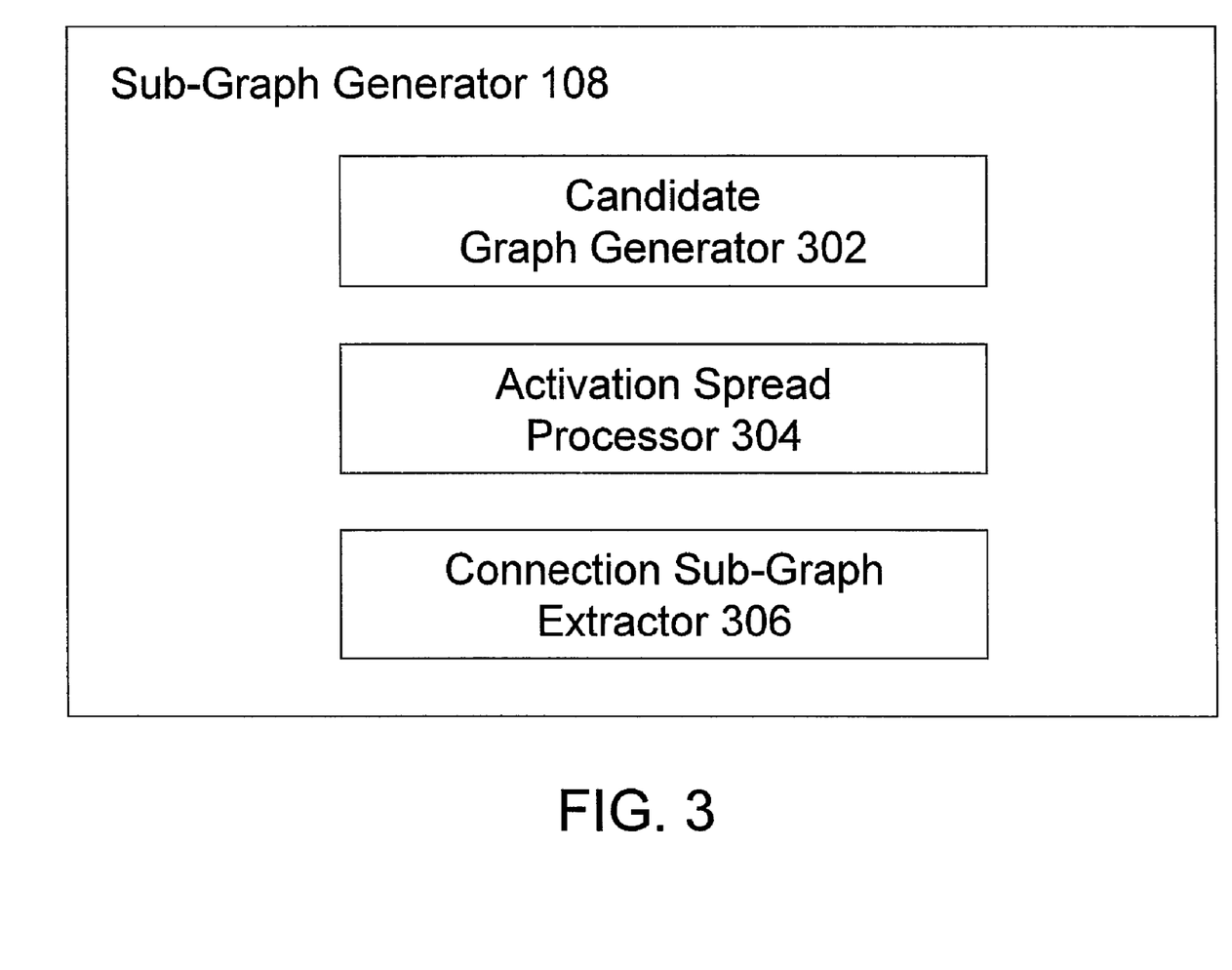
FIG. 3 is a block diagram that illustrates sample tools for identifying important relationships between entities in entity relationship graphs, according to an embodiment of the invention.

A tool that may be implemented in system 100 is an activation spread processor (304 of FIG. 3). In one embodiment, the processor may be responsible for spreading an activation value from a particular source entity, that is, assigning an initial activation value to the source entity (s, for example) and spreading the activation value to other entities, as was previously described.

For the purpose of this description, the activation spread processor may be used to identify entities that involve high activation flow between entities s and t identified in query 104. For example, the processor may use activation spread (or flow) information to identify a limited number of entities in the entity relationship graph as those through which important relationships between entities s and t may be found.

Given an activation value distribution from the activation value at entity s to other entities in the entity relationship graph, the processor can identify what are the top most contributing neighbor entities of entity t to the activation value at entity t. Alternatively, the processor may identify a group of top most contributing neighbor entities of entity t that contribute a certain threshold percentage of the activation value at entity t. For example, such a threshold percentage may be 80. Thus, all the top most contributing neighbor entities that contribute to 80% of the activation value at entity t are identified. Those identified neighbors are placed in a set of entities through which important relationships between entities s and t may be found.

For each neighbor entity such as p1, its neighbor entities' contributions to the activation value at p1 may be evaluated. Through the evaluation of contributions to the activation value at p1, the top most contributing entities to p1 may be identified and included in the set of entities through which important relationships between entities s and t. In this manner, evaluation of activation values may be iteratively and/or recursively performed to identify a set of entities through which important relationships between s and t may be found.

In an alternative embodiment, instead of evaluating a neighbor's contribution individually, one or more neighbors' contributions to a downstream entity may be grouped into a single bucket if the one or more neighbors share the same type of edge relationship between them and the downstream entity. As a result, all neighbors' contributions may be grouped in one or more buckets each of which comprise a same type of edge relationships. The determination of top most contributing neighbors may be made on the basis of bucket contribution instead of individual neighbor contribution. Thus, for the purpose of this description, all variations of approaches in determining the topmost contributing entities to another entity are within the scope of the invention.

After deriving the set of entities through which important relationships may be identified, the connection sub-graph generator 108 may use an iterative and/or recursive process to traverse paths that may be formed between entities s and t through entities in the set, evaluate information contents of the paths, and (successively) select those paths that have the highest information contents to be included in the connection sub-graph 102. In various embodiments, damping factors and greedy algorithms may be additionally or optionally used to prevent infinite loops and to terminate the selection process within a finite number of iteration or recursions.

Strong Connections

As noted before, the connection sub-graph generator employs a measure that indicates how strongly connected a relationship between two entities such as s and t are relative to other relationships there between. In one embodiment, such a measure for a path such as p above measures activation contributed by p to entity t and is defined as follows:

$$Ac(p) = \text{Activation}(s) * \text{damp}(\text{length}(p)) * \text{branching}(p)$$

Where Activation(s) is the initial activation score assigned to entity s, length(p) is the number of hops between s and t (each hop is defined as an interconnection between two neighboring entities), damp(length(p)) is a composite damp factor that may be in the form of $\beta^{length(p)}$ ($\beta$ is a simple damp factor having a value of less than one and is used to damp an activation contribution from an immediate neighboring entity), and branching(p) is $1/(d\_(s+1)*d\_(s+2)* \ldots d\_(t-2) *d\_(t-1))$. Here, $d\_(s+1)$ is the degree of entity s's immediate neighbor entity along path p, $d\_(s+2)$ is the degree of entity s's immediate neighboring entity's immediate neighboring entity along path p. Similarly, $d\_(t-1)$ is the degree of entity t's immediate neighbor entity along path p, $d\_(t-2)$ is the degree of entity t's immediate neighboring entity's immediate neighboring entity along path p.

Thus, if path p comprises a small number of hops between entities s and t, then the composite damp factor is still large enough for path p to contribute a significant activation score to entity t. On the other hand, if path p comprises a large number of hops between entities s and t, then the composite damp factor is very small since $\beta$ is less than one and $\beta^{length(p)}$ is even smaller than $\beta$. As a result, the contribution of entity s's activation score through path p is relatively insignificant.

The measure Ac also depends on (i.e., inversely proportional to) the degrees of the intermediate entities (i.e., nodes or vertexes). For example, if an intermediate entity has a large number of branches and thus a high degree, then the contribution to entity t's activation is smaller as a result of a large dispersion since the activation at such an intermediate entity is divided evenly among all the branches. On the other hand, if an intermediate entity has a small number of branches and thus a low degree, then the contribution to entity t's activation is larger as a result of a small dispersion.

Therefore, Ac value of a path may be used as a measure indicating how strongly two entities are connected through a path p (or a relationship p). In one embodiment, the connection sub-graph generator selects paths to be included in the connection sub-graph based on whether these paths have relatively high Ac values. As a result, a strongly connected set of paths, or relationships, may be identified from the entity relationship graph.

Diversity of Paths

In an embodiment, the connection sub-graph generator employs a measure that indicates how rare a relationship between two entities is relative to other relationships there between. In one embodiment, such a measure for a path such as p above is defined as follows:

$$EB(p) = (-\Sigma_{E \in Edges(p)} \log(Pr(EdgeType(E))))/|Edges(p)|$$

Where Edges(p) is the set of all edge relationships included in a path p between two entities such as s and t, |Edges(p)| is the size of set Edges(p) (i.e., number of edge relationships included in p), E is a summation parameter representing an edge relationship in set Edges(p), EdgeType(E) is the type of edge E, and Pr(EdgeType(E)) is defined as the number of edge relationships in the entity relationship graph that are of Edgetype(E) divided by the total number of all edge relationships in the entity relationship graph.

Thus, if path p comprises a rare edge relationship E, then Pr(EdgeType(E)) for such an edge E is much less than one. Correspondingly, the logarithmic value of such a Pr value will be a negative number with a large absolute value. As a result, the contribution of such an edge relationship to EB(p) is large. As a further result, such a path comprising rare edge relationships will have a large overall EB(p) value as compared with a different type of path that is relatively commonplace.

On the other hand, if path p comprises only commonplace relationships, then following the same reasoning set forth above, it may be concluded that such a path will have a small overall EB value.

Therefore, EB value of a path may be used as a measure indicating how rare a path is among all possible relationships between two entities. In one embodiment, the connection sub-graph generator 108 selects paths to be included in the connection sub-graph 102 based on whether these paths have relatively high EB values. As a result, a diverse set of different path types, or relationship types, may be identified from the entity relationship graph 106.

Connection Sub-Graph Extractor

A tool that may be implemented in system 100 is a connection sub-graph extractor (306 of FIG. 3). In one embodiment, the extractor performs the iterative and/or recursive process of evaluating information contents of possible paths for the purpose of selecting some to be included in the connection sub-graph 102. In one embodiment, based on a formula for a path's information content, the extractor assigns a score to the path (e.g., between the entities specified in query 104). In one embodiment, the larger a path's score, the more important the path. Thus, in this embodiment, the connection sub-graph extractor may select a path if its score is higher than all possible paths. In one embodiment, the extractor initially creates an empty connection sub-graph and adds entities on the selected path (e.g., with the highest score) to the connection sub-graph. In one embodiment, this process is repeated until a sufficient number of entities are identified and included in the connection sub-graph.

In one embodiment, once an entity is included in the connection sub-graph, subsequent selection of a best path with the highest score as previously described may be performed as if the included entity does not exist. Thus, if a path passes through any included entity (in the interim, expanding connection sub-graph), the included entity's prestige does not figure in the calculation of the path's score.

Example Extensions

For the purpose of illustration, inputs to the connection sub-graph generator 108 have been described as one or more entity relationship graphs that may be stored in one or more databases and as query 104. However, this description is not so limited. Other inputs to the sub-graph generator 108 may also be used. For example, the above mentioned an entity' prestige may be stored in one or more databases (which may or may not be the same databases that store the entity relationship graphs), as shown as 110 of FIG. 1. Such entity prestige may be accessed by the sub-graph generator 108. Furthermore, an entity's prestige may be assigned manually by a user, or automatically by some program logic, or a combination of user assignment and program logic. Thus, these and other inputs to the sub-graph generator 108 may also be accessed or used by the sub-graph generator 108 for the purpose of this invention in some embodiments.

For the purpose of this description, system 100 may include a different set of tools and components than the ones described above.

Example Operation

Figure 4A:
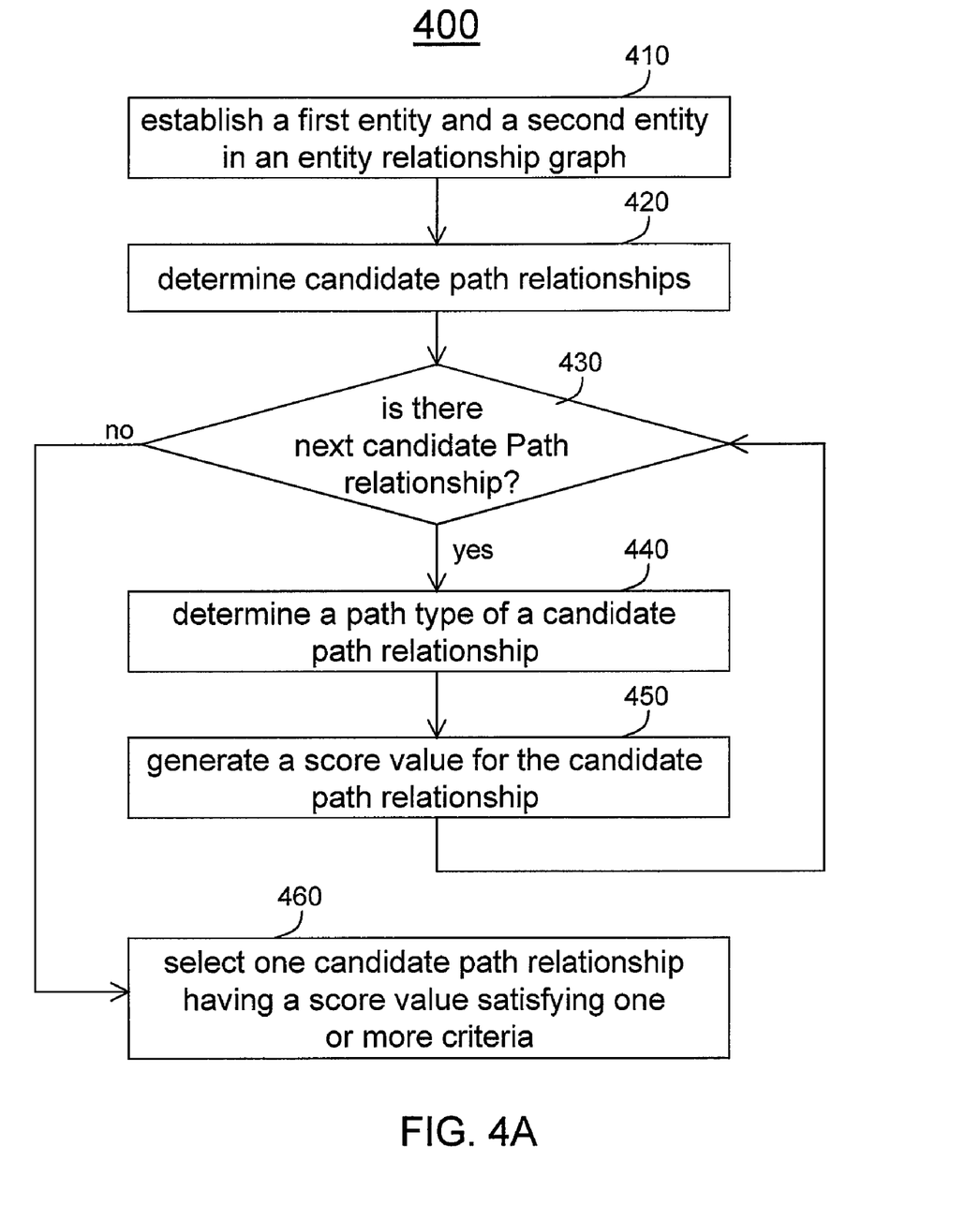
FIG. 4A is a flow diagram that illustrates a technique for identifying important relationships between entities in entity relationship graphs, according to an embodiment of the invention.

FIG. 4A is a flow diagram that illustrates a process 400 for identifying important relationships between entities in entity relationship graphs, according to an embodiment of this description. In block 410, the connection sub-graph generator establishes a first entity and a second entity (which may be, for example, entities s and t, discussed earlier) in an entity relationship graph. As previously described, the entity relationship graph comprises a set of entities interconnected through a plurality of edge relationships. The first entity and the second entity are entities in the entity relationship graph. In an embodiment, the first entity and the second entity are specified in a query (such as 104 of FIG. 1) issued by the user.

As previously described, in an embodiment, the entity relationship graph is a candidate entity relationship graph that is reduced from an original entity relationship graph.

In some embodiments, the entity relationship graph comprises typed data. For example, an entity in the entity relationship graph may be of one of a plurality of entity types that may exist in the entity relationship graph. Similarly, an edge relationship in the entity relationship graph may be of one of a plurality of edge relationship types.

Next, in block 420, the connection sub-graph generator determines a plurality of candidate path relationships between the first entity and the second entity. Here, each of the plurality of candidate path relationships terminates at both the first entity and the second entity. Such a candidate path relationship comprises one or more edge relationships in the plurality of edge relationships. The candidate path relationship may be of a path type in the form of a tuplet. The tuplet comprises one or more edge relationship types. Each edge relationship type in the one or more edge relationship types (in the tuplet) is a type of an associated edge relationship that is one of the one or more edge relationships that forms the candidate path relationship.

As described above, in at least one embodiment, in determining a plurality of candidate path relationships between the first entity and the second entity, the connection sub-graph generator may assign an initial activation value to the first entity, create an activation value distribution in the entity relationship graph by spreading the initial activation value assigned to the first entity to other entities in the entity relationship graph, determine an activation value at the second entity in the activation value distribution; and identify the plurality of candidate path relationships as one or more path relationships whose contributions to the activation value at the second entity satisfy one or more second criteria. In one embodiment as mentioned earlier, the one or more second criteria may specify that a candidate path relationship (among the candidate path relationships) goes through a neighbor entity (relative to a downstream entity along the candidate path) that is a topmost contributing neighbor entity to an activation value at a downstream entity. For example, in one embodiment, as part of the one or more second criteria, such a neighbor entity is required to be one of the top k contributing neighbor entities to the downstream entity. Alternatively, in another embodiment, as part of the one or more second criteria, such a neighbor entity is required to belong to a group of neighbor entities (relative to the downstream entity on the candidate path relationship) that collectively contribute 80% of the activation value at the downstream entity.

Next, in block 430, the connection sub-graph generator enters loop logic to evaluate each candidate path relationship in the plurality of candidate path relationship. If it is determined that there is next candidate path relationship in the plurality of candidate path relationships that has not been evaluated, then, for such a candidate path relationship, the connection sub-graph generator performs a number of steps.

Specifically, in block 440, the connection sub-graph generator determines a path type that is associated with the candidate path relationship. Then in block 450, the connection sub-graph generator generates a score value for the candidate path relationship. This score value is based in part on the path type that is associated with the candidate path relationship.

For the purpose of this description, the score value represents a likelihood that the candidate path relationship is of interest to the user (who, for example, may have issued a query such as 104 in the first place).

If the connection sub-graph generator, in block 430, determines that all of the plurality of candidate path relationships have been evaluated and assigned score values, then process 400 goes to block 460, where the connection sub-graph generator selects, in the plurality of candidate path relationships, one candidate path relationship having a score value that satisfies one or more first criteria. For example, in some embodiments, the one or more first criteria may specify the highest score value is taken. However, other score value assignment methods may be used. For example, in some other embodiments, a smaller score value may indicate a higher likelihood that an associated candidate path relationship is of interest to the user. Correspondingly, in such embodiments, the connection sub-graph generator may select a candidate path relationship having the lowest score value. The selected candidate path relationship may be included in the connection sub-graph 102.

In some embodiments, each of score values assigned to the plurality of candidate path relationships may contain one or more measures. For example, in one embodiment, the score value for the candidate path relationship includes a first measure that indicates how strongly the first entity and the second entity are connected through the candidate path relationship. In one embodiment, the score value for the candidate path relationship includes a second measure that indicates how rare the candidate path relationship is in the entity relationship graph. In one embodiment, the score value for the candidate path relationship includes a third measure that indicates how prestigious one or more entities along the candidate path are. For the purpose of this invention, various other measures may be additionally or optionally used to provide a score value in evaluating a candidate path relationship.

All or part of process 400 may be repeated to discover other candidate path relationships to be included in the connection sub-graph 102. For example, block 460 may be repeatedly invoked by the connection sub-graph generator to select more than one path relationships to be included in the connection sub-graph 102.

Example Algorithm

Figure 4B:
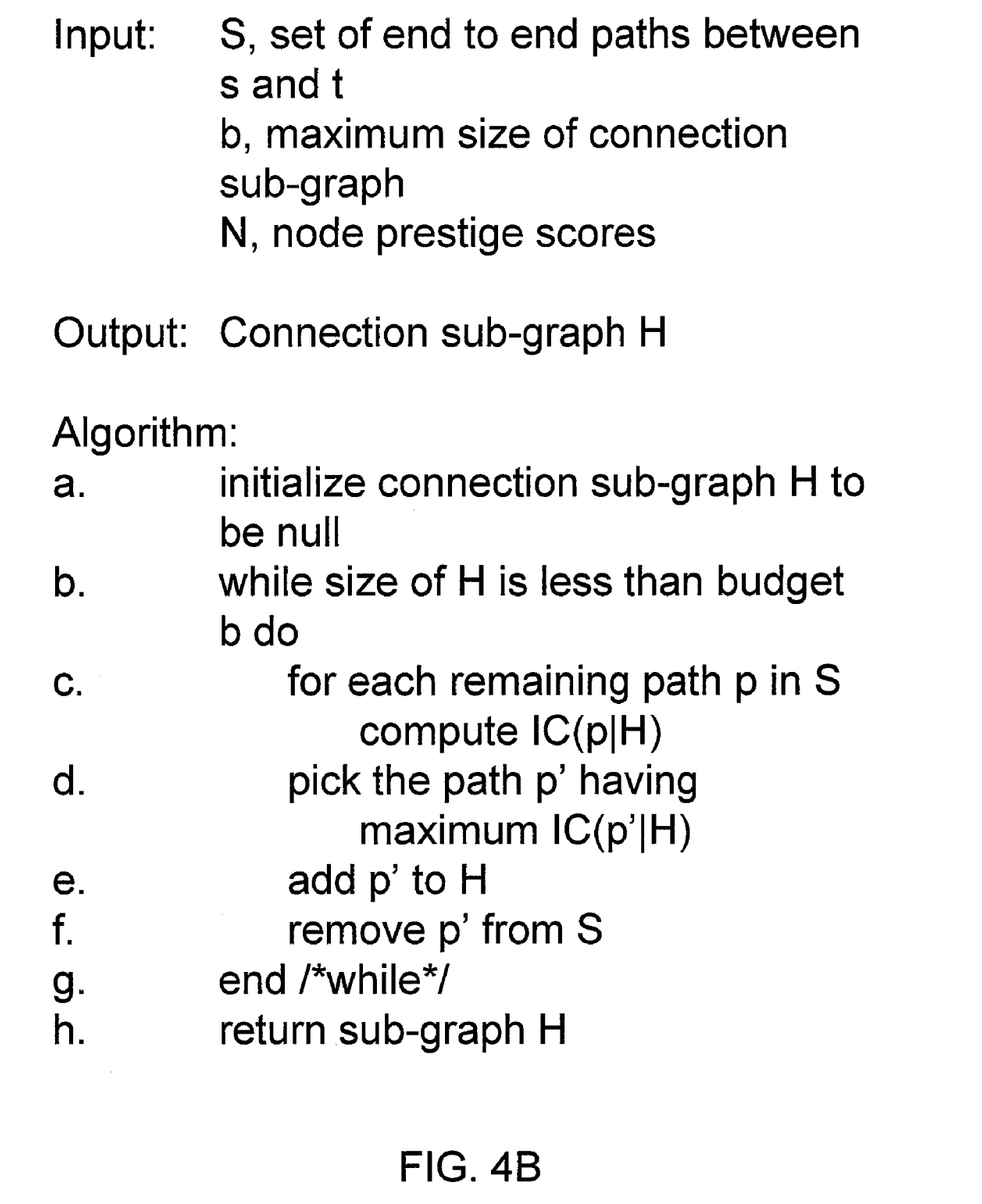
FIG. 4B is an example algorithm that illustrates a technique for identifying important relationships between entities in entity relationship graphs, according to an embodiment of the invention.

FIG. 4B is an example algorithm that may be implemented by connection sub-graph extractor 306 for identifying important relationships between entities in entity relationship graphs, according to an embodiment of this description. This example algorithm for extracting connection sub-graphs is based on path and sub-graph information content as previously defined. Roughly speaking, a set of end-to-end paths between vertices s and t is given. The connection sub-graph is initialized to NULL. Thereafter, paths are continuously added using a greedy heuristic. In each iteration of the heuristic, a path that has the highest information content given the current connection sub-graph H is added. In some embodiments, the example algorithm may be used when an upper limit (i.e., b) is optionally specified for the number of entities that may be included in the resultant connection sub-graph.

In an alternative embodiment, in step d of the example algorithm, instead of choosing a path based on IC (p'|H) as illustrated in FIG. 4B, an example implementation of the algorithm can alternatively pick a path p' that has a maximum IC(p'|H)/|Nodes(p')\Nodes(H)|, where: |Nodes(p')\Nodes(H)| is the number of entities in p' which are not already in sub-graph H.

Hardware Overview

Figure 5:
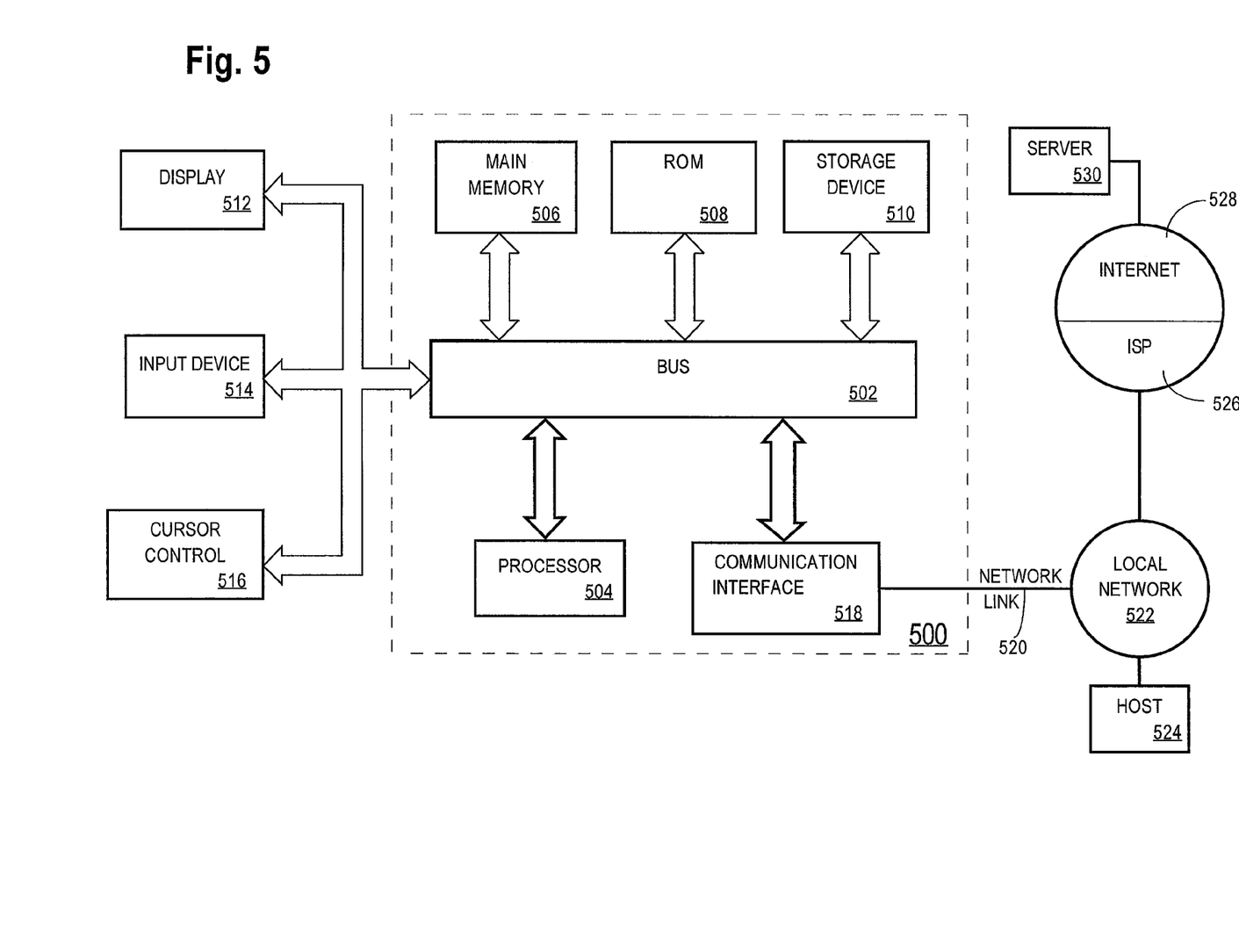
FIG. 5 is a block diagram that illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may be used to implement the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    establishing a first entity and a second entity in an entity relationship graph, wherein the entity relationship graph comprises a set of entities interconnected through a plurality of edge relationships and wherein the first entity and the second entity are included in the set of entities;
    assigning an initial activation value to the first entity;
    creating an activation value distribution in the entity relationship graph by spreading the initial activation value assigned to the first entity to other entities in the entity relationship graph;
    determining an activation value at the second entity in the activation value distribution;
    determining a plurality of candidate path relationships between the first entity and the second entity, wherein each of the plurality of candidate path relationships terminates at both the first entity and the second entity and comprises one or more edge relationships in the plurality of edge relationships;
    for each candidate path relationship in the plurality of candidate path relationships:
        determining a path type that is associated with a candidate path relationship; and
        generating a score value for the candidate path relationship based in part on the path type that is associated with the candidate path relationship;
        wherein the score value represents a likelihood that the candidate path relationship is of interest to a user; and
    selecting, in the plurality of candidate path relationships, one candidate path relationship having a score value that satisfies one or more first criteria;
    wherein the plurality of candidate path relationships is identified as one or more path relationships whose contributions to the activation value at the second entity satisfy one or more second criteria;
    wherein the method is performed by one or more computing devices.

2. A method as recited in claim 1, wherein the first entity and the second entity are specified in a query issued by the user.

3. A method as recited in claim 1, wherein the entity relationship graph is a candidate entity relationship graph that is reduced from an original entity relationship graph.

4. A method as recited in claim 1, wherein an entity in the entity relationship graph is of one of a plurality of entity types.

5. A method as recited in claim 1, wherein an edge relationship in the entity relationship graph is of one of a plurality of edge relationship types.

6. A method as recited in claim 1, wherein a candidate path relationship in the plurality of candidate path relationships is of a path type in the form of a tuplet that comprises one or more edge relationship types and wherein each edge relationship type in the one or more edge relationship types is a type of an associated edge relationship in the one or more edge relationships that forms the candidate path relationship.

7. A method as recited in claim 1, wherein the score value for the candidate path relationship includes a first measure that indicates how strongly the first entity and the second entity are connected through the candidate path relationship.

8. A method as recited in claim 1, wherein the score value for the candidate path relationship includes a second measure that indicates how rare the candidate path relationship is in the entity relationship graph.

9. A method as recited in claim 1, wherein the score value for the candidate path relationship includes a third measure that indicates how prestigious one or more entities along the candidate path are.

10. A computer-readable storage medium carrying one or more sequences of instructions which, when executed by one or more processors, causes the one or more processors to perform the method recited in claim 1.

11. A computer-readable storage medium carrying one or more sequences of instructions which, when executed by one or more processors, causes the one or more processors to perform the method recited in claim 2.

12. A computer-readable storage medium carrying one or more sequences of instructions which, when executed by one or more processors, causes the one or more processors to perform the method recited in claim 3.

13. A computer-readable storage medium carrying one or more sequences of instructions which, when executed by one or more processors, causes the one or more processors to perform the method recited in claim 4.

14. A computer-readable storage medium carrying one or more sequences of instructions which, when executed by one or more processors, causes the one or more processors to perform the method recited in claim 5.

15. A computer-readable storage medium carrying one or more sequences of instructions which, when executed by one or more processors, causes the one or more processors to perform the method recited in claim 6.

16. A computer-readable storage medium carrying one or more sequences of instructions which, when executed by one or more processors, causes the one or more processors to perform the method recited in claim 7.

17. A computer-readable storage medium carrying one or more sequences of instructions which, when executed by one or more processors, causes the one or more processors to perform the method recited in claim 8.

18. A computer-readable storage medium carrying one or more sequences of instructions which, when executed by one or more processors, causes the one or more processors to perform the method recited in claim 9.

* * * * *